(12) United States Patent
Kowalewski et al.

(10) Patent No.: US 12,217,123 B2
(45) Date of Patent: Feb. 4, 2025

(54) FLICKER MITIGATION FOR MULTIPLE INTERSPERSED ILLUMINATION SYSTEMS

(71) Applicant: ZEBRA TECHNOLOGIES CORPORATION, Lincolnshire, IL (US)

(72) Inventors: Przemyslaw Kowalewski, Rocky Point, NY (US); Darran Michael Handshaw, Sound Beach, NY (US); Robert W. DiGiovanna, Shirley, NY (US); Mark D. Anderson, Dix Hills, NY (US); Eugene B. Joseph, Coram, NY (US); Mark Drzymala, Saint James, NY (US); Miguel Orlando Rodriguez Ortiz, Coram, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 5 days.

(21) Appl. No.: 18/100,304

(22) Filed: Jan. 23, 2023

(65) Prior Publication Data
US 2023/0161984 A1 May 25, 2023

Related U.S. Application Data

(63) Continuation of application No. 16/676,398, filed on Nov. 6, 2019, now Pat. No. 11,562,161.

(51) Int. Cl.
G06K 7/10 (2006.01)
(52) U.S. Cl.
CPC ..... *G06K 7/10752* (2013.01); *G06K 7/10732* (2013.01); *G06K 7/10742* (2013.01)

(58) Field of Classification Search
CPC .......... G06K 7/10752; G06K 7/10732; G06K 7/10742
See application file for complete search history.

(56) References Cited

U.S. PATENT DOCUMENTS

| 5,844,619 A * | 12/1998 | Songer ................. H04N 7/0132 |
| | | 348/E5.076 |
| 8,902,353 B2 * | 12/2014 | Fjellstad ............ G06K 7/10732 |
| | | 348/371 |
| 9,350,973 B2 * | 5/2016 | Sali ........................ H04N 13/15 |
| 9,743,010 B1 * | 8/2017 | Edwards .............. H04N 23/745 |

(Continued)

*Primary Examiner* — Sonji N Johnson
*Assistant Examiner* — Asifa Habib
(74) *Attorney, Agent, or Firm* — Yuri Astvatsaturov

(57) ABSTRACT

A method of activating an illumination assembly within a symbology reader is provided, the illumination assembly having a first illumination source and a second illumination source, the symbology reader having an imaging sensor configured to operate at a predetermined framerate where each frame includes an exposure period over which the imaging sensor is active to capture image data and a non-exposure period over which the imaging sensor is not active to capture image data, the method comprising: during a first frame, activating the first illumination source during at least a portion of the respective exposure period and activating the second illumination source over at least a portion of the respective non-exposure period; and during a second frame, activating the second illumination source during at least a portion of the respective exposure period and activating the first illumination source over at least a portion of the respective non-exposure period.

18 Claims, 7 Drawing Sheets

(56) References Cited

U.S. PATENT DOCUMENTS

| | | | | |
|---|---|---|---|---|
| 10,803,273 | B1* | 10/2020 | Handshaw | G06K 7/146 |
| 10,904,453 | B2* | 1/2021 | Chen | H04N 23/745 |
| 2006/0113386 | A1* | 6/2006 | Olmstead | G06K 7/10732 |
| | | | | 235/455 |
| 2006/0118627 | A1* | 6/2006 | Joseph | G06K 7/10732 |
| | | | | 235/454 |
| 2010/0302420 | A1* | 12/2010 | Strat | G06K 7/10732 |
| | | | | 348/E5.091 |
| 2012/0111947 | A1* | 5/2012 | Nubling | G06K 7/10722 |
| | | | | 315/246 |
| 2012/0187191 | A1* | 7/2012 | Olmstead | G06K 7/10861 |
| | | | | 235/462.13 |
| 2012/0193429 | A1* | 8/2012 | Van Volkinburg | |
| | | | | G06K 7/10811 |
| | | | | 235/470 |
| 2012/0287332 | A1* | 11/2012 | Fjellstad | G06K 7/10732 |
| | | | | 348/E5.037 |
| 2014/0207517 | A1* | 7/2014 | Oshima | H04N 23/72 |
| | | | | 705/7.29 |
| 2014/0374482 | A1* | 12/2014 | Mazzone | G06K 7/109 |
| | | | | 235/455 |
| 2015/0035949 | A1* | 2/2015 | Rouh | H04N 13/296 |
| | | | | 348/47 |
| 2018/0183990 | A1* | 6/2018 | Chen | H04N 23/45 |
| 2018/0349585 | A1* | 12/2018 | Ahn | H04W 12/068 |
| 2019/0174042 | A1* | 6/2019 | Johannessen | H04N 23/60 |
| 2020/0233984 | A1* | 7/2020 | Kalenderidis | G06F 1/28 |
| 2021/0217271 | A1* | 7/2021 | Loose | G07F 17/3223 |

* cited by examiner

FLICKER MITIGATION FOR MULTIPLE INTERSPERSED ILLUMINATION SYSTEMS

CROSS-REFERENCE TO RELATED APPLICATIONS

The current application is a continuation of U.S. patent application Ser. No. 16/676,398, filed on Nov. 6, 2019, and incorporated herein by reference in its entirety.

BACKGROUND OF THE INVENTION

In some scenarios, it may be useful for a symbology reader (e.g., a barcode reader) to switch between multiple illumination sources (e.g., illumination sources positioned in different locations, illumination sources providing different types of illumination, etc.) when capturing an image of a symbology to be decoded.

For example, switching between left-side and right-side illumination may mitigate the effects of specular reflection on the decoding of a symbology (e.g., a barcode), i.e., by shifting any specular hot spot that is captured in an image of a symbology from frame to frame. For instance, when a left-side illumination source is turned off but a right-side illumination source remains turned on, specular reflections from the right-side illumination source may appear on the right side of a captured image of the symbology. However, the left side of the captured image of the symbology may still be readable. In contrast, when a right-side illumination source is turned off but a left-side illumination source remains turned on, specular reflections from the left-side illumination source may appear on the left side of a captured image of the symbology, while the right side of the captured image of the symbology remains readable. Consequently, it is possible to use readable portions of images of the target symbology that are captured with various combinations of the illumination sources turned on and off to reconstruct a full readable image of the target symbology. The reconstructed, readable full image of the target symbology can then be easily decoded.

As another example, switching between direct and diffuse illumination may more evenly illuminate a symbology (e.g., a barcode) printed on a curved or uneven surfaces, which may be useful for direct part marking (DPM) barcode readers configured to read barcodes that are etched or imprinted directly into the surface of materials such as plastic and metal.

However, a significant barrier to implementation for these illumination source switching techniques is the flicker fusion threshold of the human eye, which is based on the photo-receptor cells' response to light. Most humans cannot detect lights flickering at a frequency of ~50 Hz or more. However, typical symbology reader cameras capture images at 60 frames per second or slower. Consequently, when switching illumination sources for each frame, each illumination source illuminates at a frequency of 30 Hz, which falls below the flicker fusion threshold, causing a blinking effect that is detectable to the human eye.

For example, FIG. 1 is a graph illustrating illumination periods for different illumination sources of a symbology reader compared to exposure periods for an imager of the symbology reader for a symbology reader implementing an illumination source switching technique. As shown in FIG. 1, an imager of the symbology reader has exposure periods at a fixed interval, once per frame, and each of the illumination sources ("LED 1" and "LED 2") illuminate during alternating exposure periods, i.e., with one illumination source illuminating per frame. Accordingly, as shown in FIG. 1, for an imager operating with a frequency of ~60 Hz (i.e., with exposure periods beginning every 16 ms), and the two illumination sources illuminating during alternating exposure periods, each illumination source will illuminate every 32 ms (i.e., with a frequency of ~30 Hz). Consequently, because the human eye can detect blinking at a frequency slower than ~50 Hz, human operators of symbology readers implementing this illumination source switching technique may notice the blinking of the two illumination sources.

This noticeable blinking effect can be bothersome and distracting for users of a symbology reader that implements an illumination source switching technique. Accordingly, there exists a need for a symbology reader that implements an illumination source switching technique without annoying or distracting a human operator of the symbology reader with a blinking effect.

SUMMARY

In one aspect, a method of activating an illumination assembly within a symbology reader is provided, the illumination assembly having a first illumination source and a second illumination source, the symbology reader having an imaging sensor configured to operate at a predetermined framerate where each frame includes an exposure period over which the imaging sensor is active to capture image data and a non-exposure period over which the imaging sensor is not active to capture image data, the method comprising: during a first frame, activating the first illumination source during at least a portion of the respective exposure period and activating the second illumination source over at least a portion of the respective non-exposure period; and during a second frame, activating the second illumination source during at least a portion of the respective exposure period and activating the first illumination source over at least a portion of the respective non-exposure period.

In another aspect, an apparatus for reading symbology is provided. The apparatus comprises: a housing; an imaging sensor; an illumination assembly, the illumination assembly including a first illumination source and a second illumination source; and a controller configured to: cause the imaging sensor to operate at a predetermined framerate where each frame includes an exposure period over which the imaging sensor is active to capture image data and a non-exposure period over which the imaging sensor is not active to capture image data; and (a) during a first frame, cause the first illumination source to activate over at least a portion of the respective exposure period and cause the second illumination source to activate over at least a portion of the respective non-exposure period; and (b) during a second frame, cause the second illumination source to activate over at least a portion of the respective exposure period and cause the first illumination source to activate over at least a portion of the respective non-exposure period.

In still another aspect, a method of activating an illumination assembly within a symbology reader is provided, the illumination assembly having a first illumination source and a second illumination source, the first illumination source being configured to illuminate an illumination target with visible light, and the second illumination source being configured to illuminate the illumination target with non-visible light, the symbology reader having an imaging sensor configured to operate at a predetermined framerate where each frame includes an exposure period over which the imaging sensor is active to capture image data and a non-exposure period over which the imaging sensor is not active to capture image data, the method comprising: during a first frame, activating the first illumination source during at least a portion of the respective exposure period; and during a second frame, activating the second illumination source during at least a portion of the respective exposure period and activating the first illumination source over at least a portion of the respective non-exposure period.

In another aspect, an apparatus for reading symbology is provided. The apparatus comprises: a housing; an imaging sensor; an illumination assembly, the illumination assembly including a first illumination source and a second illumination source, the first illumination source being configured to illuminate an illumination target with visible light, and the second illumination source being configured to illuminate the illumination target with non-visible light; and a controller configured to: cause the imaging sensor to operate at a predetermined framerate where each frame includes an exposure period over which the imaging sensor is active to capture image data and a non-exposure period over which the imaging sensor is not active to capture image data; (a) during a first frame, cause the first illumination source to activate over at least a portion of the respective exposure period; and (b) during a second frame, cause the second illumination source to activate over at least a portion of the respective exposure period and cause the first illumination source to activate over at least a portion of the respective non-exposure period.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
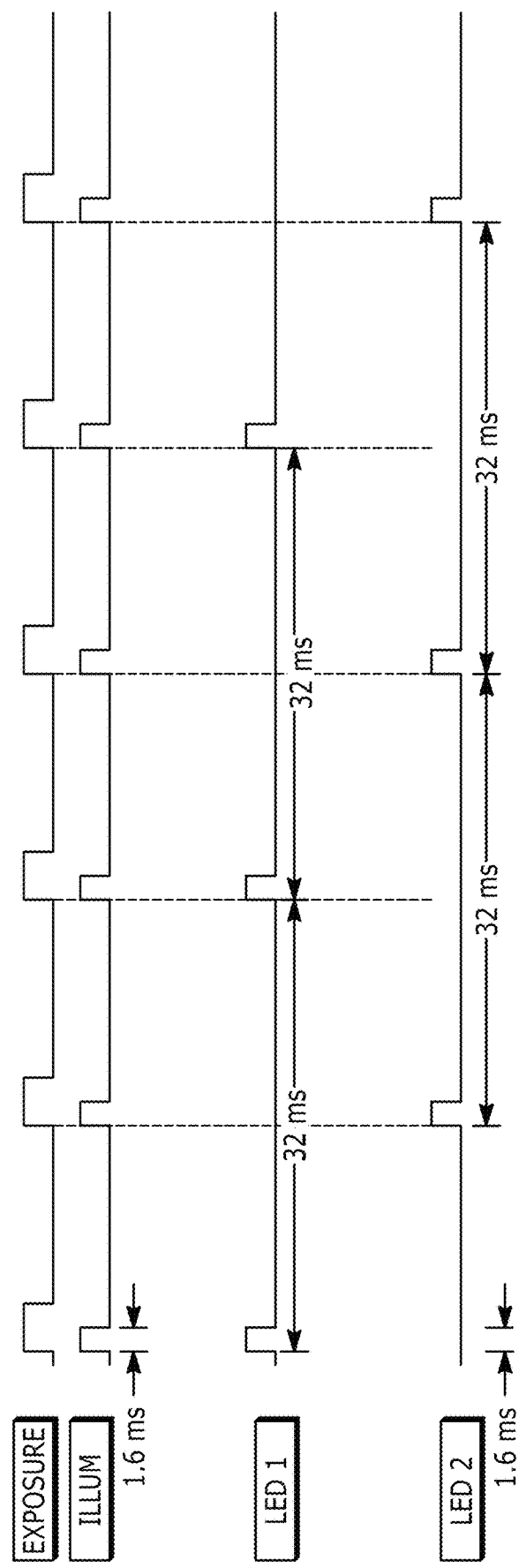
FIG. 1 is a graph illustrating illumination periods for different illumination sources of a symbology reader compared to exposure periods for an imager of the symbology reader for a symbology reader implementing an illumination source switching technique.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As discussed above, there exists a need for a symbology reader that implements an illumination source switching technique without annoying or distracting a human operator of the symbology reader with a flickering or blinking effect.

The present disclosure provides an illumination source switching technique in which a first illumination source of a symbology reader is activated concurrently with an exposure period of an image sensor of the symbology reader during a first frame, and, following the end of the exposure period, a second illumination source of the symbology reader is turned activated in a "dummy pulse" during a non-exposure period of the first frame. In a subsequent frame, the second illumination source is activated concurrently with an exposure period of the image sensor, while the first illumination source is activated in a dummy pulse during a non-exposure period following the end of the exposure period of the second frame. The dummy pulses effectively increase the illumination frequency for each illumination source from 30 to 60 Hz. This change effectively eliminates any appearance of blinking or flickering to the user. Advantageously, because the dummy pulses are activated during non-exposure periods, the dummy pulses have no effect on the image data captured by the image sensor. In instances in which the symbology reader includes more than two illumination sources, any illumination sources that are not activated during the exposure period flash a dummy pulse during the non-exposure period to ensure that each illumination source is activated at a rate greater than 50 Hz. Furthermore, in instances in which one of the illumination sources emits visible light and the other illumination source emits light on a non-visible spectrum, only the visible light illumination source will emit a dummy pulse. That is, the non-visible illumination source does not require a dummy illumination pulse, as the frequency of non-visible illumination pulses would not bother a user in the first place.

Figure 2:
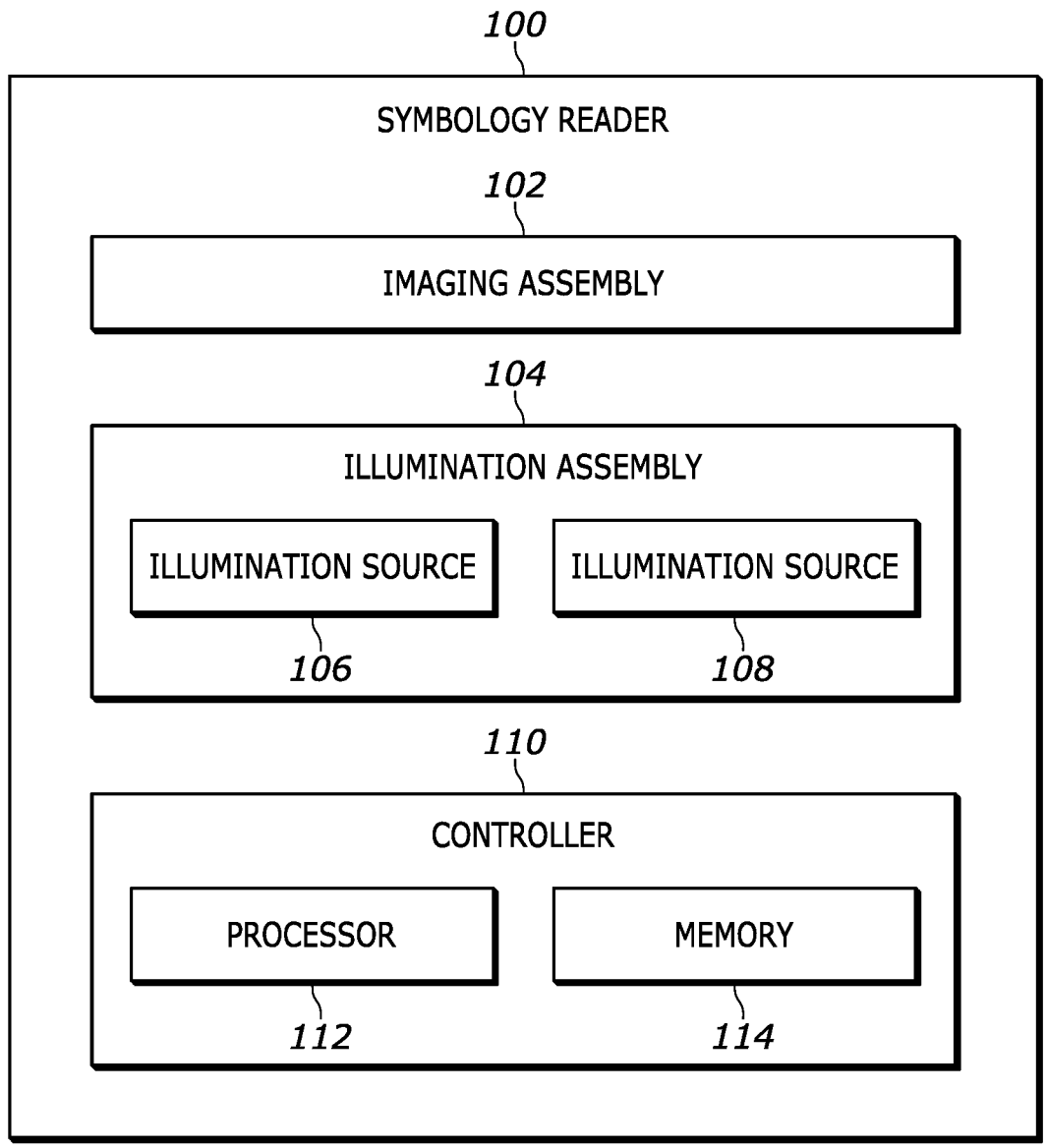
FIG. 2 illustrates an exemplary block diagram schematic of a symbology reader having multiple illumination sources, in accordance with an embodiment of the present invention.

Referring now to the drawings, FIG. 2 illustrates an exemplary block diagram schematic of a symbology reader 100, in accordance with an embodiment of the present invention. As shown in FIG. 2, the symbology reader 100 may include an imaging assembly 102, an illumination assembly 104, and a controller 110, which may include one or more processors 112 and one or more memories 114.

The imaging assembly 102 may include an imaging sensor configured to operate at a predetermined framerate where each frame includes an exposure period over which the imaging sensor is active to capture image data and a non-exposure period over which the imaging sensor is not active to capture image data.

The illumination assembly 104 may include two or more illumination sources 106 and 108, e.g., a first illumination source 106 and a second illumination source 108. In some examples, the illumination sources 106 and 108, which may be light emitting diodes (LEDs), may be positioned to illuminate a target symbology (e.g., a barcode) from different angles or positions, e.g., from a right side and from a left side. Additionally, in some examples, the illumination sources 106 and 108 may be configured to illuminate a target symbology in different ways, e.g., with one illumination source providing diffuse illumination and another illumination source providing direct illumination. Furthermore, in some examples, one of the illumination sources 106 and 108 may be configured to provide visible illumination of a target symbology, while another of the illumination sources 106 and 108 may be configured to provide non-visible illumination of the target symbology (e.g., infrared light illumination).

In one example, the first illumination source 106 and the second illumination source 108 may be configured to switch between illuminating during the exposure period and illuminating during the non-exposure period in different (in some examples, alternating) frames. For instance, during a first frame, the first illumination source 106 may be configured to illuminate a target symbology during at least a portion of the exposure period, while the second illumination source 108 may be configured to illuminate the target during at least a portion of the non-exposure period. During a second frame, the second illumination source 108 may be configured to illuminate the target during at least a portion of the exposure period, while the first illumination source 106 may be configured to illuminate the target during at least a portion of the non-exposure period. This pattern may continue, with the first illumination source 106 illuminating the target during an exposure period of a third frame while the second illumination source 108 illuminates the target during the non-exposure period of the third frame, and the second illumination source 108 illuminating the target during an exposure period of a fourth frame while the first illumination source 106 illuminates the target during the non-exposure period of the fourth frame, etc.

Figure 3:
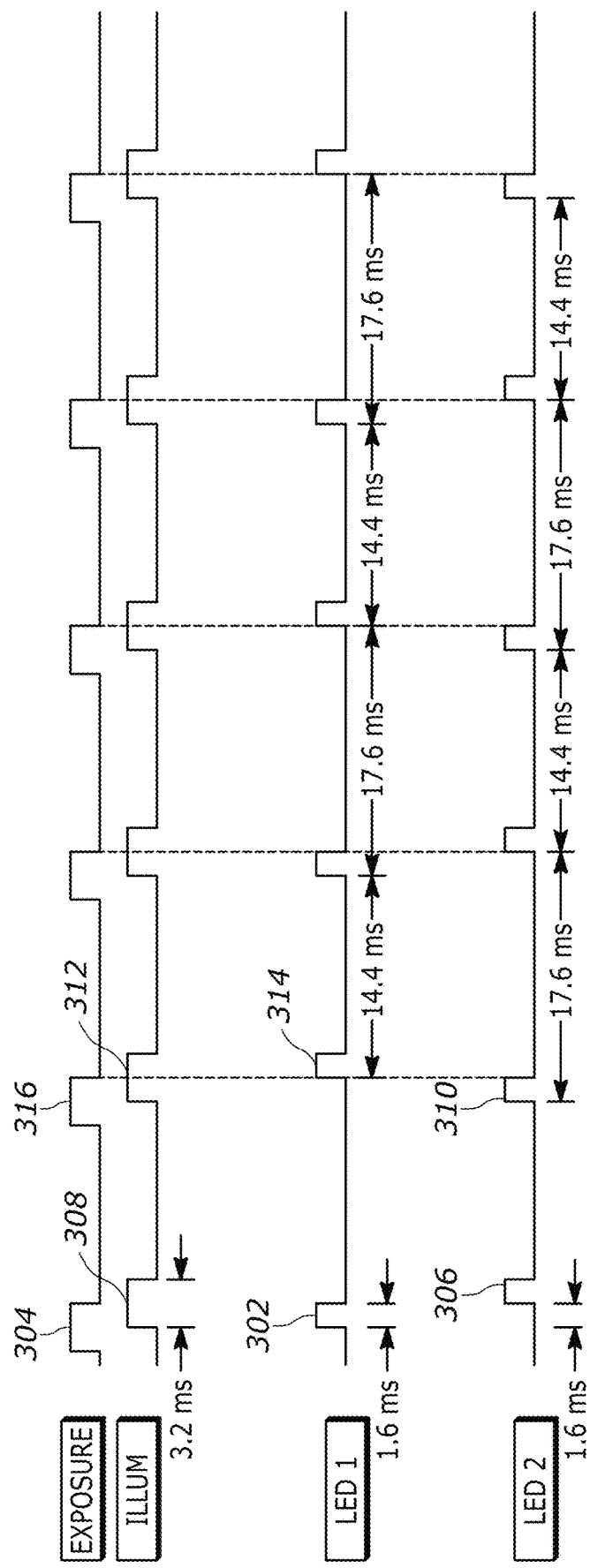
FIGS. 3-5 illustrate illumination periods for different illumination sources of a symbology reader compared to exposure periods for an imager of the symbology reader, for symbology readers implementing illumination source switching techniques that mitigate flickering or blinking effects, in accordance with embodiments of the present invention.
Figure 4:
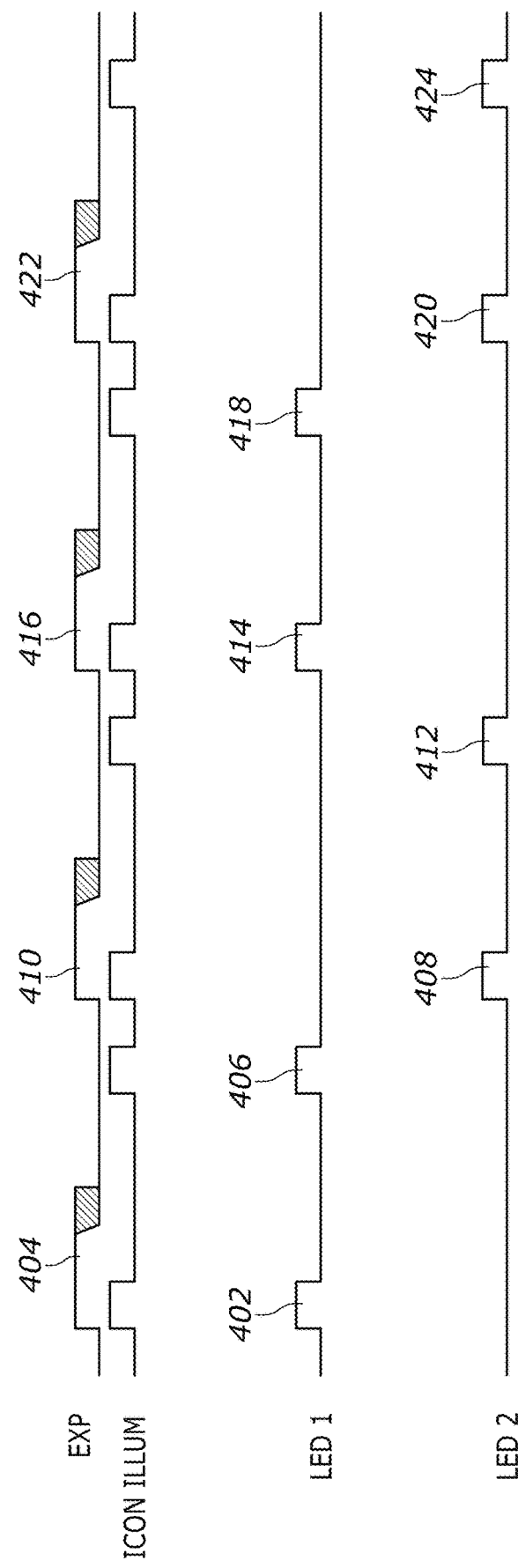
Figure 5:
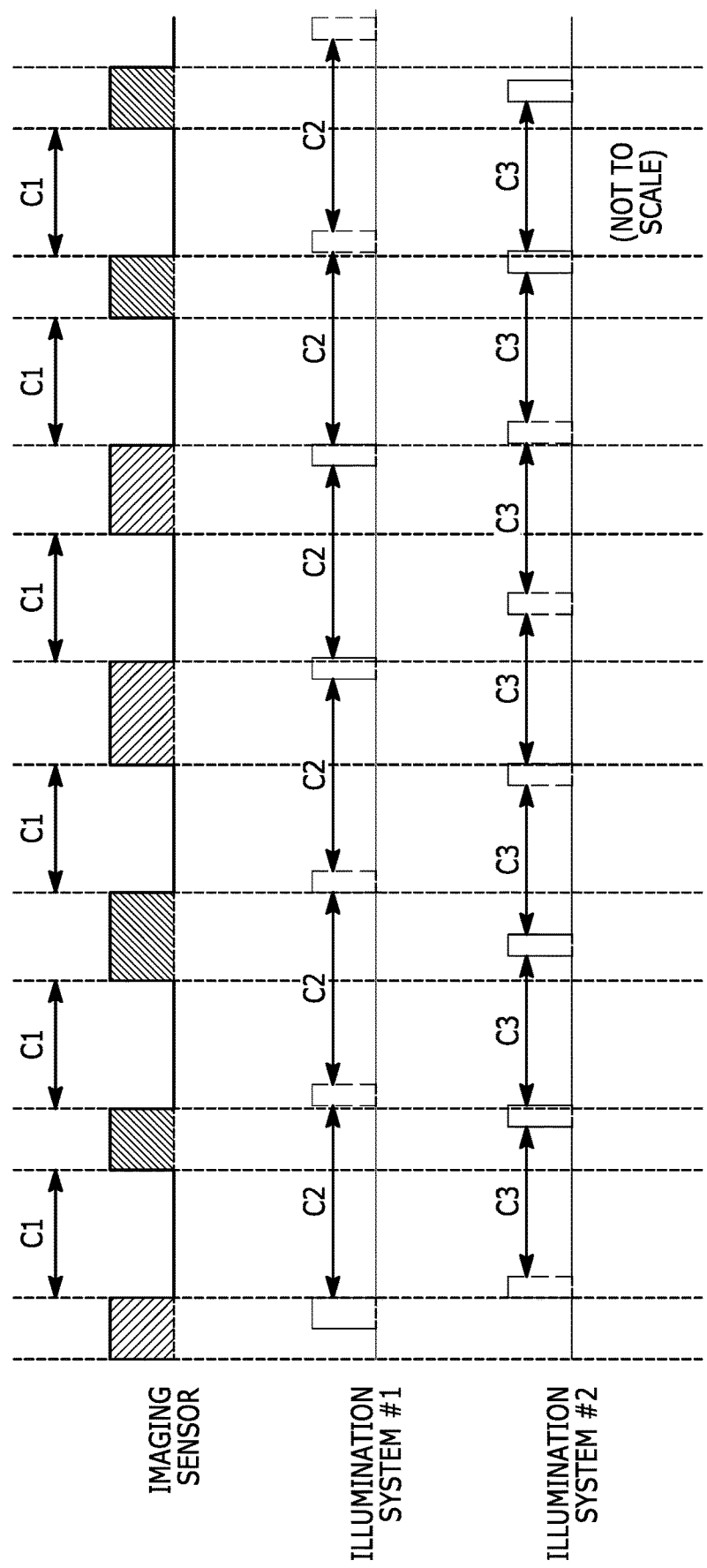

In other examples, the illumination sources may activate in different orders or patterns than described above. However, as long as each pulse of a given illumination source begins approximately 18 ms (or shorter) after the end of the previous pulse, each illumination source will have a pulse frequency greater than the flicker fusion threshold of 50 Hz, and, accordingly, users will not notice a blinking or flickering effect. FIGS. 3-5 illustrate examples of illumination periods compared to exposure periods for various embodiments of the present disclosure.

For instance, FIG. 3 illustrates one example of illumination periods for a first and second illumination source 106, 108 of a symbology reader 100 compared to exposure periods for an imager of an imaging assembly 102 of the symbology reader 100. As shown in FIG. 3, a first illumination source ("LED 1") is activated for an illumination period 302 of 1.6 ms during a first exposure period 304, and a second illumination source ("LED 2") is activated for an illumination period 306 of 1.6 ms during a non-exposure period immediately following the exposure period 304 (and immediately following illumination period 302), for a combined illumination 308 period of 3.2 ms. The second illumination source is then activated for an illumination period 310 of 1.6 ms during a second exposure period 312, and the first illumination source is activated for an illumination period 314 of 1.6 ms during a non-exposure period immediately following the exposure period 312 (and immediately following the illumination period 312), for a combined illumination period 316 of 3.2 ms. This process repeats for each subsequent frame, with the first and second illumination sources alternating between activating during exposure periods and non-exposure periods. For exposure periods 304, 312, etc., that occur every 16 ms, the first illumination source will activate every 14.4 ms-17.6 ms, and the second illumination source will also activate every 14.4 ms-17.6 ms, with each illumination source having a pulse frequency greater than the flicker fusion threshold of 50 Hz.

FIG. 4 illustrates another example of illumination periods for a first and second illumination source 106, 108 of a symbology reader 100 compared to exposure periods for an imager of an imaging assembly 102 of the symbology reader 100. As shown in FIG. 4, a first illumination source ("LED 1") is activated for an illumination period 402 during a first exposure period 404, and is subsequently activated for another illumination period 406 following the first exposure period 404 (i.e., during a non-exposure period following the first exposure period 404). Then, a second illumination source ("LED 2") is activated for an illumination period 408 during a second exposure period 410, and is subsequently activated for another illumination period 412 following the second exposure period 410 (i.e., during a non-exposure period following the second exposure period 410). Next, the first illumination source is activated for an illumination period 414 during a third exposure period 416, and is subsequently activated for another illumination period 418 following the third exposure period 416 (i.e., during a non-exposure period following the third exposure period 416). Then, the second illumination source is activated for an illumination period 420 during a fourth exposure period 422, and is subsequently activated for another illumination period 424 following the fourth exposure period 422 (i.e., during a non-exposure period following the fourth exposure period 422). This process repeats for each subsequent frame, with the first illumination source activating in two pulses, one during and one after an exposure period, and the second illumination source activating in two pulses, one during and one after a subsequent exposure period, and so on. As long as each pulse of a given illumination source begins approximately 18 ms (or shorter) after the end of the previous pulse, each illumination source will have a pulse frequency greater than the flicker fusion threshold of 50 Hz, and, accordingly, users will not notice a blinking or flickering effect.

FIG. 5 illustrates still another example of illumination periods for a first and second illumination source 106, 108 of a symbology reader 100 compared to exposure periods for an imager of an imaging assembly 102 of the symbology reader 100. As shown in FIG. 5, a first illumination source ("Illumination System #1") is activated at a consistent frequency (with a spacing of "C2" between each pulse), and a second illumination source ("Illumination System #2") is activated at a consistent frequency (with a spacing of "C3" between each pulse) that may be different from the frequency at which the first illumination source is operated. While the spacing between exposure periods ("C1" as shown in FIG. 5) is consistent, in the example shown in FIG. 5, the length of the exposure periods may be modulated so that alternating exposure periods include a pulse from the first illumination source, then a pulse from the second illumination source, and so on. As discussed above, as long as the C1 and C2 time periods are approximately 18 ms (or shorter), each illumination source will have a pulse frequency greater than the flicker fusion threshold of 50 Hz, and, accordingly, users will not notice a blinking or flickering effect.

Referring back to FIG. 2, the symbology reader 100 may further include a number of various software applications (not shown) stored in the one or more memories 114. Each of the various software applications may be executed on the same processor 112 or on different processors, in various embodiments. Generally speaking, one or more of the applications may perform at least a portion of any of the methods 600 and 700 of activating an illumination assembly within a symbology reader shown in FIGS. 6 and 7, respectively. For example, the applications may perform one or more functions related to, inter alia, operating the illumination sources 106 and 108 and the imaging assembly 104 using an illumination source switching technique that mitigates flickering or blinking effects, e.g., as discussed above with respect to FIGS. 3-5. In some instances, two or more of the foregoing applications may be combined as an integral application. Moreover, additional or alternative applications may be included in various embodiments.

Figure 6:
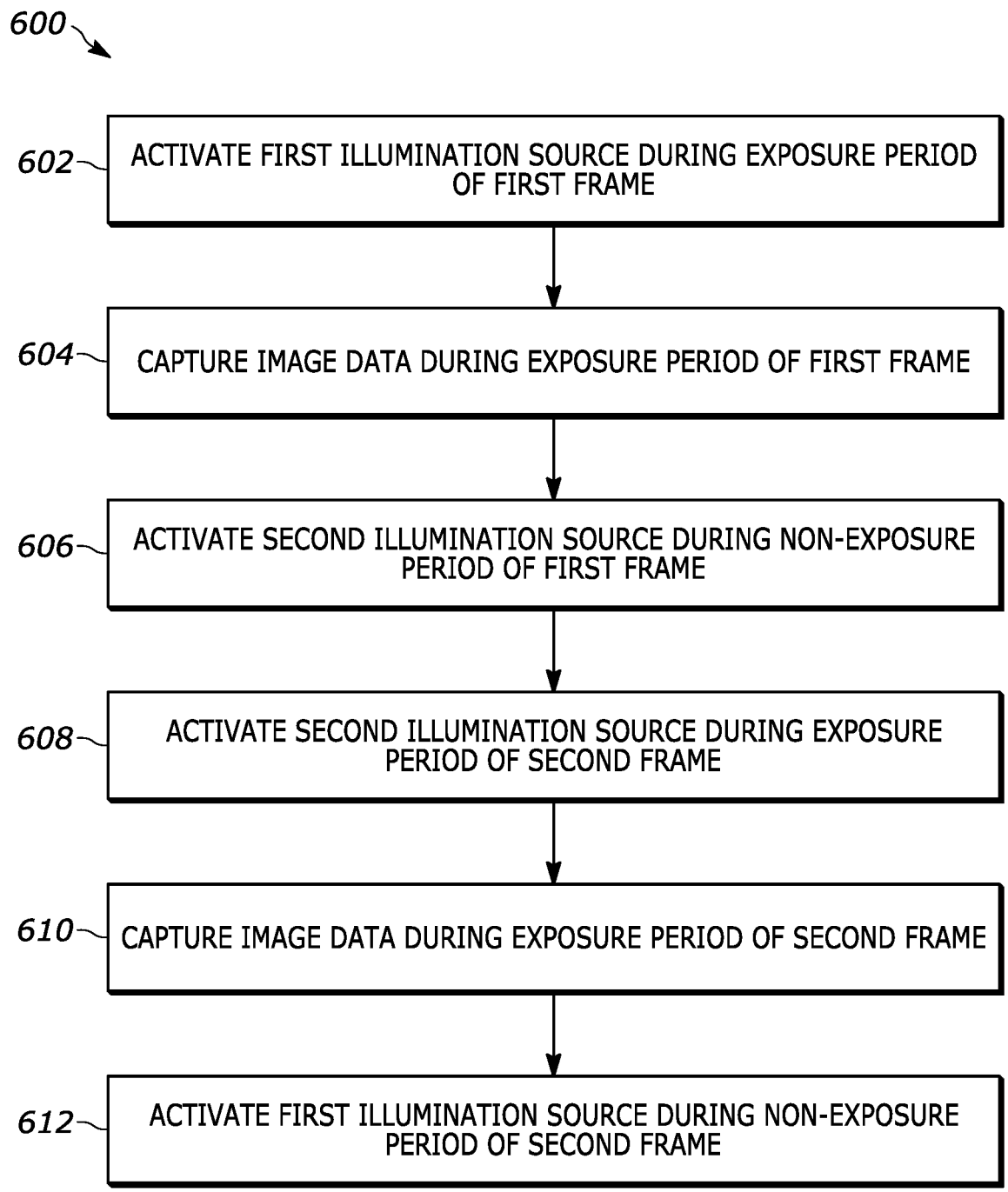
FIG. 6 illustrates a flow diagram representative of an exemplary method of activating an illumination assembly within a symbology reader, in accordance with an embodiment of the present invention.

FIG. 6 illustrates a flow diagram representative of an exemplary method 600 of activating an illumination assembly within a symbology reader (e.g., a barcode reader), in accordance with an embodiment of the present invention. The method 600 can be implemented as a set of instructions stored on a computer-readable memory and executable on one or more processors.

At block 602, a first illumination source may be activated during at least a portion of an exposure period of a first frame. In some examples, the first illumination source may be activated at or near the beginning of the exposure period of the first frame. Moreover, in some examples, the first illumination source may be deactivated at or near an end of the exposure period of the first frame.

At block 604, image data may be captured during the exposure period of the first frame, e.g., by a camera or an image sensor.

At block 606, a second illumination source may be activated during at least a portion of a non-exposure period of the first frame. In particular, the image sensor may not capture image data during the non-exposure period of the first frame. That is, during the first frame, the second illumination source may be activated while image data is not being captured. In some examples, the second illumination source may be activated at or near the beginning of the non-exposure period of the first frame. Moreover, in some examples, the activation of the first illumination source during the exposure period of the first frame and the second illumination source during the non-exposure period of the first frame may combine to produce a constant first-frame illumination (e.g., a constant first-frame illumination for a period of 3 ms-4 ms). That is, in some examples, the second illumination source may be activated immediately after the first illumination source is deactivated during the first frame. Furthermore, in some examples, the second illumination source may be activated before the first illumination source is deactivated during the first frame, i.e., the two illumination sources may overlap for some period of time during the first frame.

At block 608, the second illumination source may be activated during at least a portion of an exposure period of a second frame. In some examples, the second frame immediately follows the first frame. In some examples, the second illumination source may be activated at or near the beginning of the exposure period of the second frame. Moreover, in some examples, the second illumination source may be deactivated at or near an end of the exposure period of the second frame. Furthermore, in some examples, the duration between the activation of the second illumination source during the non-exposure period of the first frame and the activation of the second illumination source during the exposure period of the second frame is greater than or equal to 14 ms and less than or equal to 18 ms.

At block 610, image data may be captured during the exposure period of the second frame, e.g., by a camera or an image sensor.

At block 612, the first illumination source may be activated during at least a portion of a non-exposure period of the second frame. In particular, the image sensor may not capture image data during the non-exposure period of the second frame. That is, during the second frame, the first illumination source may be activated while image data is not being captured. In some examples, the first illumination source may be activated at or near the beginning of the non-exposure period of the second frame. For instance, in some examples, the duration between the activation of the first illumination source during the exposure period of the first frame and the activation of the first illumination source during the non-exposure period of the second frame is greater than or equal to 14 ms and less than or equal to 18 ms.

Moreover, in some examples, the activation of the second illumination source during the exposure period of the second frame and the first illumination source during the non-exposure period of the second frame may combine to produce a constant second-frame illumination (e.g., a constant first-frame illumination for a period of 3 ms-4 ms). That is, in some examples, the first illumination source may be activated immediately after the second illumination source is deactivated during the second frame. Furthermore, in some examples, the first illumination source may be activated before the second illumination source is deactivated during the second frame, i.e., the two illumination sources may overlap for some period of time during the second frame.

In some examples, the steps of the method 600 may be repeatedly performed until the symbology reader successfully decodes a symbology captured, as the image data, by the imaging sensor.

Figure 7:
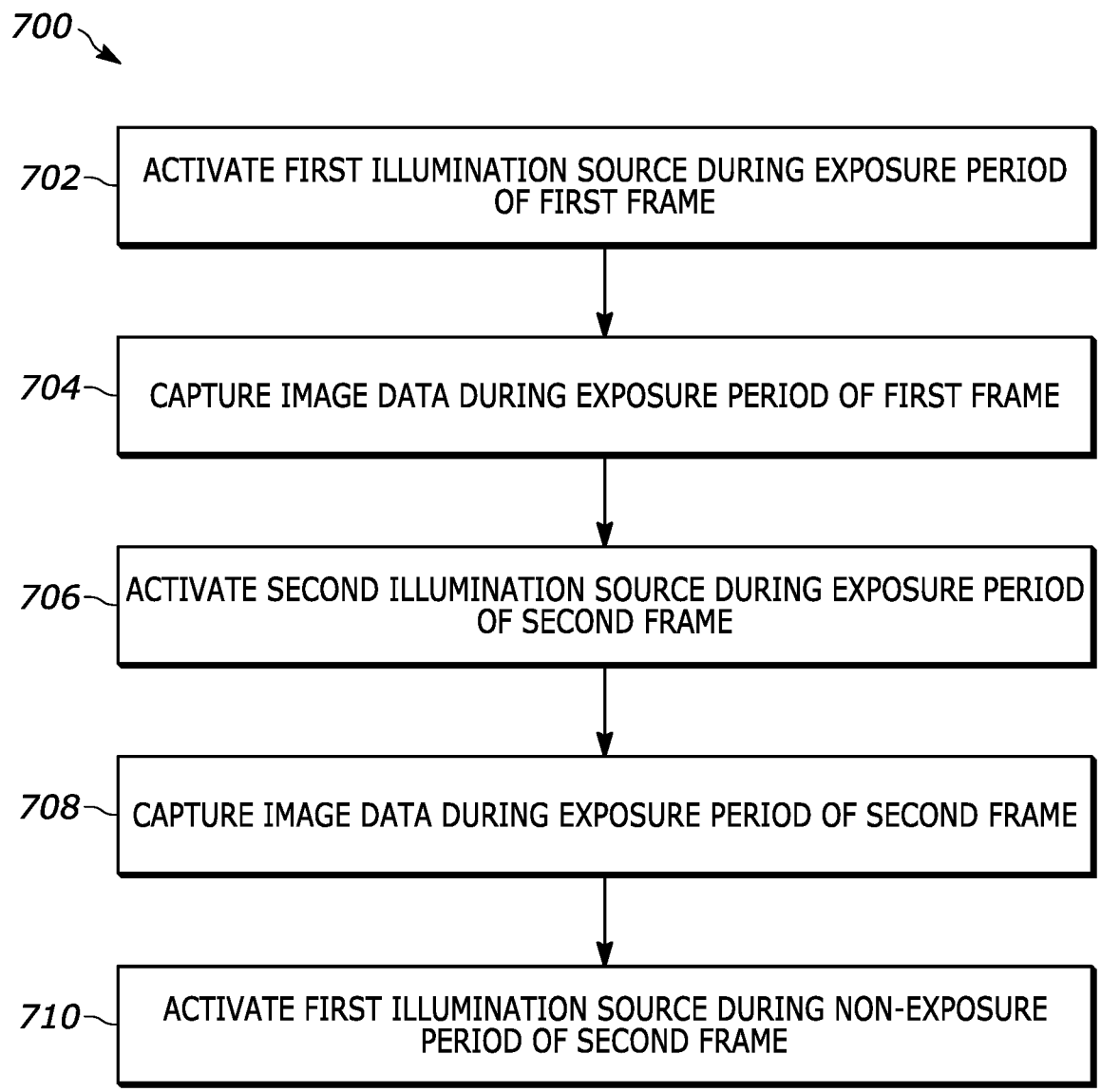
FIG. 7 illustrates a flow diagram representative of an exemplary method of activating an illumination assembly within a symbology reader when at least one illumination source emits visible light and at least one illumination source emits non-visible light, in accordance with an embodiment of the present invention.

FIG. 7 illustrates a flow diagram 700 representative of an exemplary method of activating an illumination assembly within a symbology reader when at least one illumination source emits visible light and at least one illumination source emits non-visible light, in accordance with an embodiment of the present invention. The method 700 can be implemented as a set of instructions stored on a computer-readable memory and executable on one or more processors.

At block 702, a first illumination source that emits visible light may be activated during at least a portion of an exposure period of a first frame. In some examples, the first illumination source may be activated at or near the beginning of the exposure period of the first frame. Moreover, in some examples, the first illumination source may be deactivated at or near an end of the exposure period of the first frame.

At block 704, image data may be captured during the exposure period of the first frame, e.g., by a camera or an image sensor.

At block 706, a second illumination source that emits non-visible light (e.g., infrared light) may be activated during at least a portion of an exposure period of a second frame. In some examples, the second frame immediately follows the first frame. In some examples, the second illumination source may be activated at or near the beginning of the exposure period of the second frame. Moreover, in some examples, the second illumination source may be deactivated at or near an end of the exposure period of the second frame.

At block 708, image data may be captured during the exposure period of the second frame, e.g., by a camera or an image sensor configured to capture infrared images.

At block 710, the first illumination source may be activated during at least a portion of a non-exposure period of the second frame. In particular, the image sensor may not capture image data during the non-exposure period of the second frame. That is, during the second frame, the first illumination source may be activated while image data is not being captured. In some examples, the first illumination source may be activated at or near the beginning of the non-exposure period of the second frame. For instance, in some examples, the duration between the activation of the first illumination source during the exposure period of the first frame and the activation of the first illumination source during the non-exposure period of the second frame is greater than or equal to 14 ms and less than or equal to 18 ms.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of activating an illumination assembly within a symbology reader, the illumination assembly having a first illumination source and a second illumination source, the first illumination source being configured to illuminate an illumination target with visible light, and the second illumination source being configured to illuminate the illumination target with non-visible light, the symbology reader having an imaging sensor configured to operate at a predetermined framerate where each frame includes an exposure period over which the imaging sensor is active to capture image data and a non-exposure period over which the imaging sensor is not active to capture image data, the method comprising:
(a) during a first frame, activating the first illumination source during at least a portion of the respective exposure period and activating the second illumination source over at least a portion of the respective non-exposure period such that the first illumination source is not activated at the same time as the second illumination source; and
(b) during a second frame, activating the second illumination source during at least a portion of the respective exposure period and activating the first illumination source over at least a portion of the respective non-exposure period such that the first illumination source is not activated at the same time as the second illumination source.

2. The method of claim 1, wherein the non-visible light is infrared light.

3. The method of claim 1, wherein the second frame immediately follows the first frame.

4. The method of claim 1, further comprising:
(c) repeatedly performing (a) and (b) until the symbology reader successfully decodes a symbology captured, as the image data, by the imaging sensor.

5. The method of claim 1, wherein:
(a) further includes, during the first frame, activating the first illumination source at or near a beginning of the respective exposure period; and
(b) further includes, during the second frame, activating the second illumination source at or near a beginning of the respective exposure period and activating the first illumination source at or near a beginning of the respective non-exposure period.

6. The method of claim 1, wherein:
(a) further includes, during the first frame, deactivating the first illumination source at or near an end of the respective exposure period; and
(b) further includes, during the second frame, deactivating the second illumination source at or near an end of the respective exposure period and activating the first illumination source at or near a beginning of the respective non-exposure period.

7. The method of claim 1, wherein a duration between an activation of the first illumination source during the first frame and an activation of the first illumination source during the second frame is greater than or equal to 14 ms and less than or equal to 18 ms.

8. The method of claim 1, wherein:
(a) further includes, during the first frame, deactivating the first illumination source at or near an end of the respective exposure period; and
(b) further includes, during the second frame, deactivating the second illumination source at or near an end of the respective exposure period and activating the first illumination source at or near a beginning of the respective non-exposure period.

9. An apparatus for reading symbology, comprising:
a housing;
an imaging sensor;
an illumination assembly, the illumination assembly including a first illumination source and a second illumination source, the first illumination source being configured to illuminate an illumination target with visible light, and the second illumination source being configured to illuminate the illumination target with non-visible light; and a controller configured to:
cause the imaging sensor to operate at a predetermined framerate where each frame includes an exposure period over which the imaging sensor is active to capture image data and a non-exposure period over which the imaging sensor is not active to capture image data; and
(a) during a first frame, cause the first illumination source to activate over at least a portion of the respective exposure period and activating the second illumination source over at least a portion of the respective non-exposure period such that the first illumination source is not activated at the same time as the second illumination source; and
(b) during a second frame, cause the second illumination source to activate over at least a portion of the respective exposure period and cause the first illumination source to activate over at least a portion of the respective non-exposure period such that the first illumination source is not activated at the same time as the second illumination source.

10. The apparatus of claim 9, wherein the non-visible light is infrared light.

11. The apparatus of claim 9, wherein the second frame immediately follows the first frame.

12. The apparatus of claim 9, wherein the controller is further configured to:
(d) repeatedly perform (a) and (b) until the symbology reader successfully decodes a symbology captured, as the image data, by the imaging sensor.

13. The apparatus of claim 9, wherein:
(a) further includes, during the first frame, causing the first illumination source to activate at or near a beginning of the respective exposure period; and
(b) further includes, during the second frame, causing the second illumination source to activate at or near a beginning of the respective exposure period and causing first illumination source to activate at or near a beginning of the respective non-exposure period.

14. The apparatus of claim 9, wherein:
(a) further includes, during the first frame, causing the first illumination source to deactivate at or near an end of the respective exposure period; and
(b) further includes, during the second frame, causing the second illumination source to deactivate at or near an end of the respective exposure period and causing the first illumination source to activate at or near a beginning of the respective non-exposure period.

15. The apparatus of claim 9, wherein a duration between an activation of the first illumination source during the first frame and an activation of the first illumination source during the second frame is greater than or equal to 14 ms and less than or equal to 18 ms.

16. The apparatus of claim 15, wherein:
(a) further includes, during the first frame, causing the first illumination source to deactivate at or near an end of the respective exposure period;
(b) further includes, during the second frame, causing the second illumination source to deactivate at or near an end of the respective exposure period and causing the first illumination source to activate at or near a beginning of the respective non-exposure period.

17. The apparatus of claim 9, wherein activating the first illumination source causes an illumination target to be illuminated with diffuse light, and wherein activating the second illumination source causes the illumination target to be illuminated with direct light.

18. The apparatus of claim 9, wherein activating the first illumination source causes an illumination target to be illuminated from a right side, and wherein activating the second illumination source causes the illumination target to be illuminated from a left side.

* * * * *